(12) United States Patent
Meir

(10) Patent No.: US 8,013,302 B2
(45) Date of Patent: Sep. 6, 2011

(54) THERMAL VISION AND HEAT SEEKING MISSILE COUNTERMEASURE SYSTEM

(76) Inventor: Ronen Meir, Ashkelon (IL)

( * ) Notice: Subject to any disclaimer, the term of this patent is extended or adjusted under 35 U.S.C. 154(b) by 354 days.

(21) Appl. No.: 12/376,436

(22) PCT Filed: Aug. 8, 2007

(86) PCT No.: PCT/IL2007/000990
§ 371 (c)(1),
(2), (4) Date: Feb. 5, 2009

(87) PCT Pub. No.: WO2008/018072
PCT Pub. Date: Feb. 14, 2008

(65) Prior Publication Data
US 2010/0000231 A1    Jan. 7, 2010

(51) Int. Cl.
*G01J 5/20* (2006.01)
(52) U.S. Cl. .................................. 250/338.4
(58) Field of Classification Search .............. 250/330, 250/332, 339.03, 339.04, 338.4
See application file for complete search history.

(56) References Cited

U.S. PATENT DOCUMENTS

| | | | |
|---|---|---|---|
| 6,338,292 | B1 | 1/2002 | Reynolds et al. |
| 7,102,814 | B1 | 9/2006 | Hughes |
| 2004/0213982 | A1 | 10/2004 | Touzov |
| 2005/0052310 | A1 | 3/2005 | Snaper |

*Primary Examiner* — Mark R Gaworecki
(74) *Attorney, Agent, or Firm* — Deborah Gador

(57) ABSTRACT

The present invention relates to an infrared detection countermeasure system for enabling concealment of objects from identification by thermal imaging night vision systems and/or for deception of heat seeking missiles. The system comprises a screen formed of at least one thermoelectric module, couplable to a target object, a controller for controlling the thermoelectric module, at least two temperature sensors for measuring ambient temperature and temperature of one side of the thermoelectric module and providing an indication of the temperature to the controller, and a power source coupled to the thermoelectric module. The controller is coupled to the power source for causing the power source to provide a level of power, selected in accordance with the temperature indications, to the thermoelectric module so as to generate a selected temperature in at least part of said screen.

14 Claims, 14 Drawing Sheets

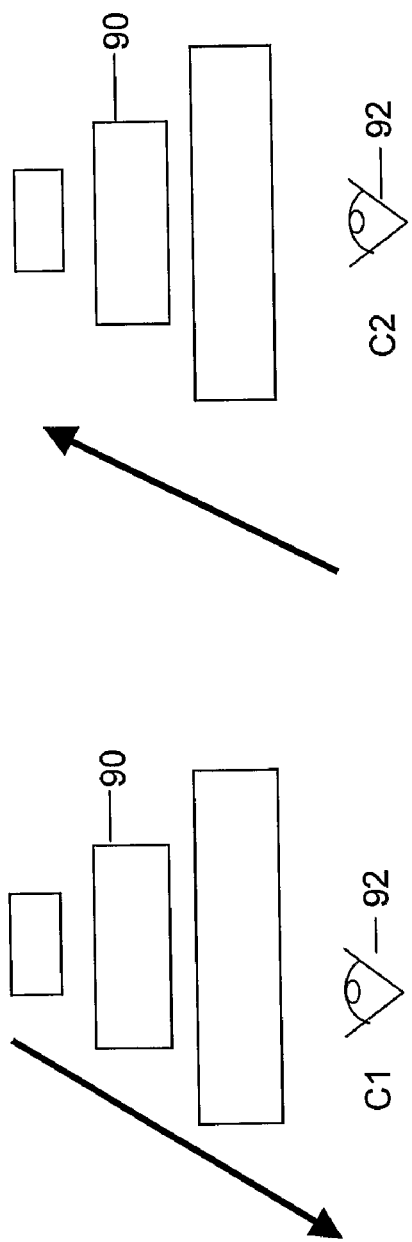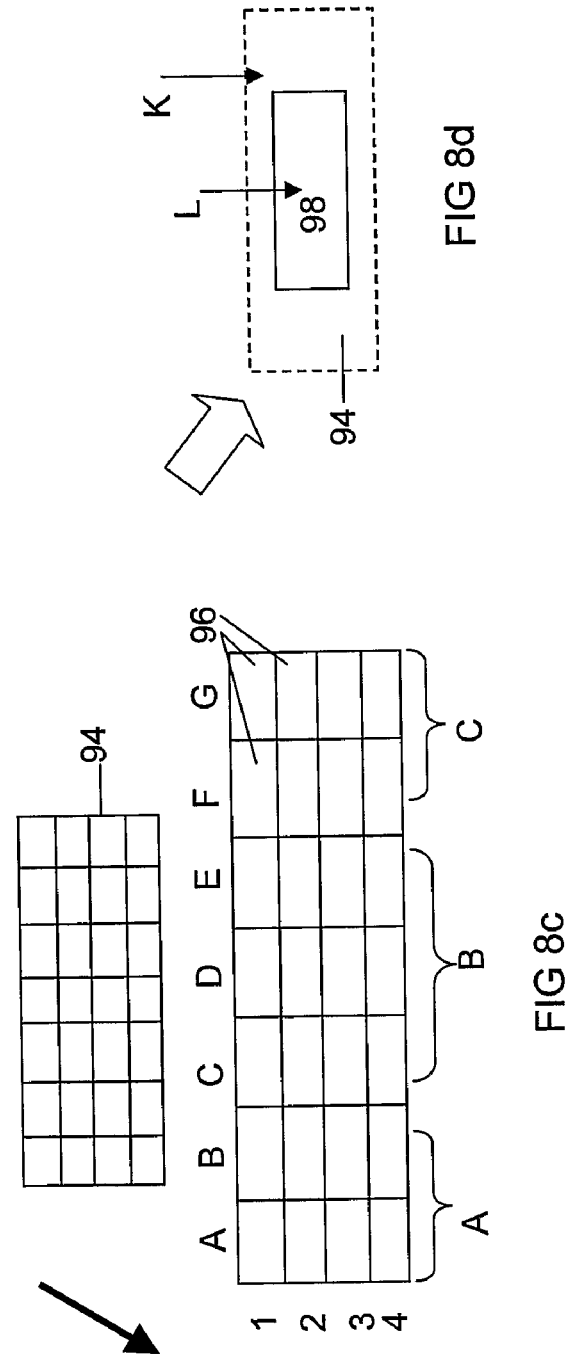

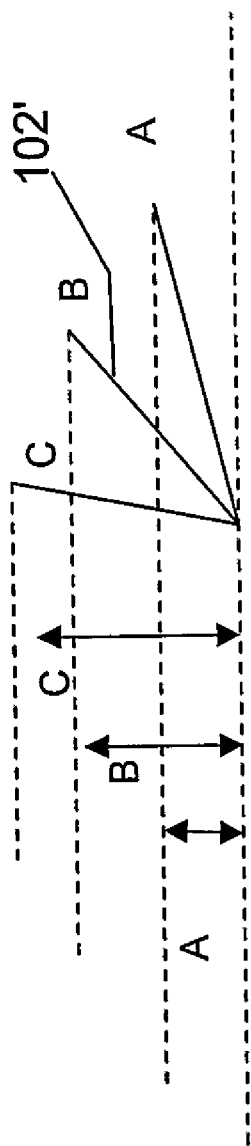
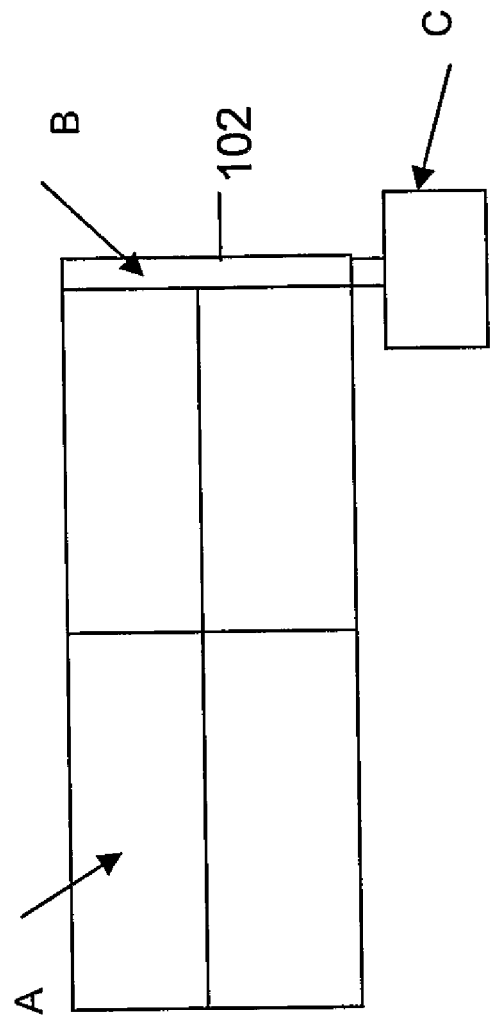
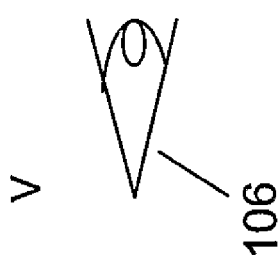
FIG 10a
FIG 10b

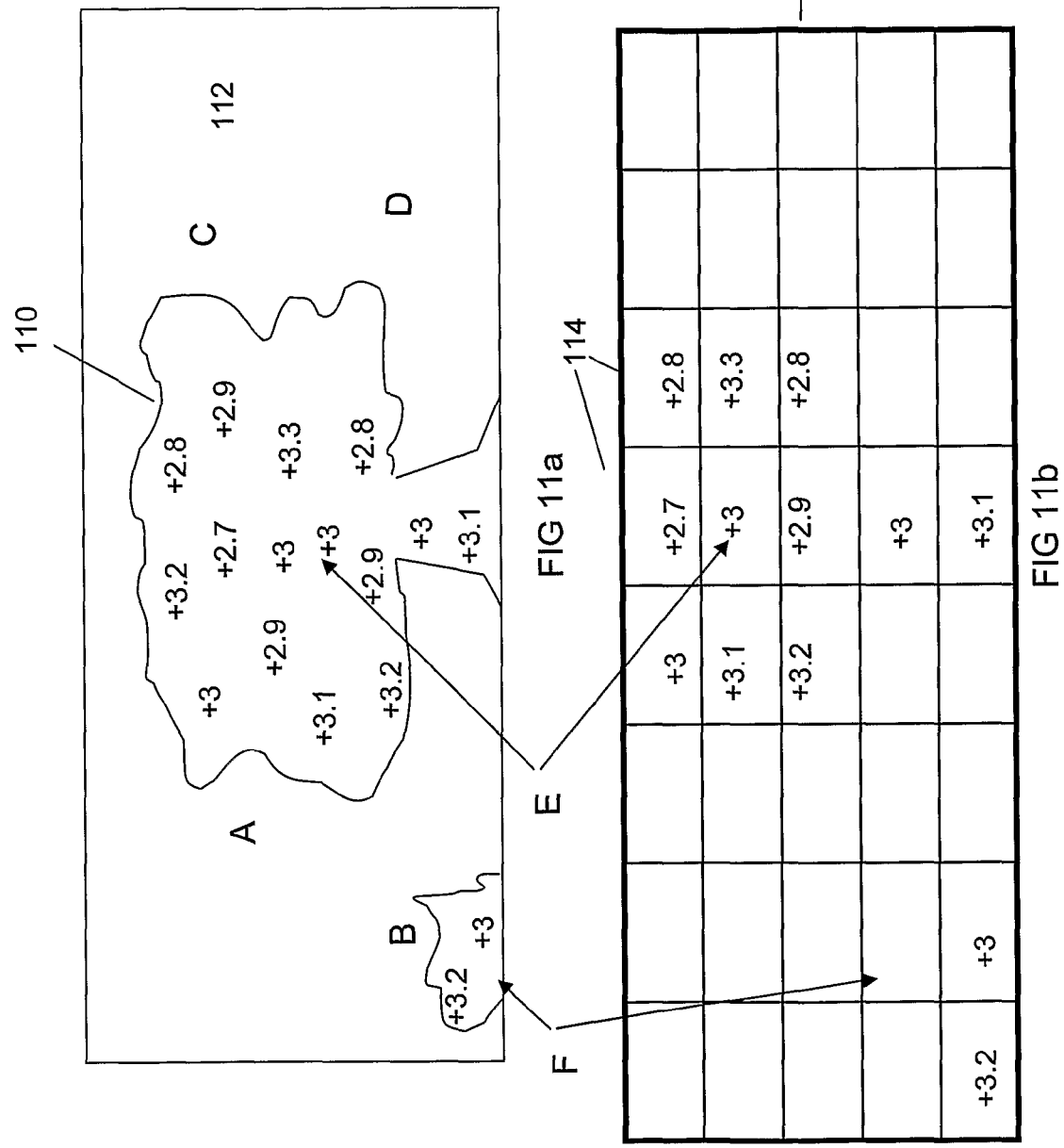

THERMAL VISION AND HEAT SEEKING MISSILE COUNTERMEASURE SYSTEM

FIELD OF THE INVENTION

The present invention relates to a system and method of concealing objects from identification by thermal imaging night vision systems in general, and, in particular, to an active system and method for protecting objects from thermal imaging and from heat-seeking missiles.

BACKGROUND OF THE INVENTION

The impact of the target thermal structure on seeker and sensor acquisition is well known.

Night vision systems are used extensively for military and security purposes. These include thermal imaging cameras and ATR (automatic target recognition) systems that automatically classify targets by their thermal signature.

There are two principle approaches:

1) Detecting infrared radiation, which is a form of energy emitted by all objects regardless of the ambient light conditions, using an infrared camera.

2) Intensifying the small amount of light present, even at night, from the stars and the moon.

Most objects have a radiated temperature either higher or lower than their background. Even if the radiated temperature differences are less than a degree, they can be detected. If there is no difference between the temperature of an object and its background, the object cannot be seen by a thermal imaging night vision system or by infra red based heat seeking missiles.

Thermal imaging can see through light fog and mist and, more importantly, through most camouflage. The fire control systems of most armored vehicles have night vision, usually thermal imaging.

Today, solutions based on active countermeasures against infrared detection and tracking can be combined with passive stealth measures; these include infrared jamming (i.e., mounting of flickering infrared radiators to confuse the tracking circuits of heat-seeking missiles) and the launching of infrared decoy flares.

Usually, targets are easier to identify at night, because their radiated temperature is hotter than their background. Some targets, such as tanks and APCs, have internal temperature variations that form visible patterns. The shapes of the hottest vehicle parts, such as engines and exhausts, appear bright. Objects with a medium temperature, such as the warm tracks, appear dim. Objects with a cool temperature, such as the cool hull, appear black.

The sources of infrared energy are solar heat, fuel combustion heat, frictional heat, and reflected radiance.

Solar Heat—comes from the sun and affects the exterior surface of objects. The heating highlights the outline of the object, providing recognition cues to the viewer, which are usually similar to the overall appearance of the target. These shape cues are recognizable out to medium ranges (800 to 1,200 meters) and can be detected at long ranges (2,000 meters). Since the sides of vehicles have more defined contours, side views are usually easier to recognize than the front views.

Fuel Combustion Heat—comes from operating engines. The heat is conducted to the surfaces of the surrounding engine compartment. Because engine compartment temperatures reach up to 200 degrees F., the surfaces of these compartments radiate features that can be detected.

Frictional Heat—produced by the moving parts of vehicles. Its heat is less intense than the high temperatures from the engine combustion. Frictional heat is generated only when the vehicle is in motion and provides long-range cues to classify the vehicle as wheeled or tracked.

Reflected Radiance—smooth, glossy surfaces, such as windshields and glossy, painted fenders, reflect radiation images from other sources. These reflections can produce odd images.

A gun tube is visible when recently fired, as the gun tube is heated up. Similarly, the transport mechanism becomes warmer and more visible.

All Infrared (IR) direct threat weapons require line of sight (LOS) to be established prior to launch and the in-flight missile must maintain LOS with the target heat source until impact (or detonation of the proximity fuse). IR missiles require the operator to visually detect the target and energize the seeker before the sensor acquires the target. The operator must track the target with the seeker caged to the LOS, until it is determined that the IR sensor is tracking the target and not any background objects. In addition, semi-automatic homing IR missiles detect the missile and navigate by IR sensing of the target. The IR sensor is also susceptible to atmospheric conditions (haze, humidity), the signature of the aircraft and its background, flares, decoys, and jamming.

Man Portable Air Defense Systems (MANPADS) pose a serious threat to aircraft at present. Rather than simply providing a second bright IR source in an attempt to draw an approaching missile away from a targeted aircraft, Directed Infrared Countermeasures Systems (DIRCM) use beams of light produced by a variety of means, such as flashlamps, to exploit knowledge about the design of reticle-scan MANPADS seekers to defeat their homing mechanisms. In many MANPADS, a reticle within the seeker causes pulses of light from the target aircraft to "shine" on the missile's infrared detector. The IR detector senses the IR radiation and sends an electric signal to the guidance package, which determines the target location and allows the missile to track the target aircraft's location and movement through the sky. By shining a modulated light towards the seeker, an IRCM system provides the infrared detector with extra "false" data, which deceives or "jams" the missile, causing it to miss its intended victim.

Viewing targets during normal and limited visibility requires gunner training on thermal target recognition, identification, and engagement. The gunner or ATR must interpret unusual images with the night tracker. These images, called thermal target signatures or infrared target signatures, are different from the images seen in the day tracker. Targets stand out in these infrared images and can be recognized at long ranges on a clear night and at reduced ranges during limited visibility. However, the recognition task requires trained and experienced gunners so the task may not be simple.

Other Terms that May Enhance Detection by Thermal Viewer and Countermeasure by this Patent During rain or snow, background objects and frictionally heated and solar-heated target features lose heat. Frictional heat loss is caused by water and mud collecting on the tracks, wheels, and other transport system parts. Engine compartment and exhaust temperatures remain high. Landmarks, such as trees, trails, and contour features, are often lost. The loss of heat in background objects reduces scene clutter, such as trees and rocks, and can increase target detection. In this type of situation the system ability of camouflage (stealth) is well needed.

In a target-rich environment on a dry, clear night, high-confidence identification requires a thermal image of such features as road wheels, turret shapes, gun tube and exhaust location. Thus, target recognition is a difficult task that requires an expert, so any change of heat signature will create chaos.

In order to help those who are not experts, Automatic Target Recognition (ATR) has been developed. Automatic Target Recognition is an application of computer vision to identify targets (such as tanks or airplanes) in an image. The process involves obtaining essential features (edges, ridges, corners) from each local geographical area in the image and comparing it to the stored templates of known targets. If a match is found, then the target is declared to be present at that location.

Environmental monitoring, earth-resource mapping, and military systems require broad-area imaging at high resolutions. Many times the imagery must be acquired in inclement weather or during night as well as day. Synthetic Aperture Radar (SAR) provides such a capability. SAR systems take advantage of the long-range propagation characteristics of radar signals and the complex information processing capability of modern digital electronics to provide high-resolution imagery. Synthetic aperture radar complements photographic and other optical imaging capabilities because of the minimum constraints on time-of-day and atmospheric conditions and because of the unique responses of terrain and cultural targets to radar frequencies. Thus, synthetic aperture radar technology can provide reconnaissance and targeting information to military operations When using automatic target detection with SAR imagery, the matching process is very difficult because of the noisy clutter background. Additionally, the target pose (orientation) and scale variation (due to imaging altitude) add to the complexity of the process.

Helicopters and other rotorcraft provide slightly different problems than land vehicles. In order to confuse thermal heat seeking missiles and avoid hitting and detection, the choice today is to throw flares that burn at high temperatures and generate a dominating infra-red signature. However, it is not possible to use such flares near the ground when forces are deployed or when there is need to evacuate wounded soldiers, as they can hurt the forces. Also, there exist smart missiles systems which can discriminate between flares and the real target.

Accordingly, there is a long felt need for a system to permit objects to remain hidden from thermal detection devices, and it would be very desirable if this system can operate in a variety of different ways.

SUMMARY OF THE INVENTION

There is provided according to the present invention a thermal vision countermeasure system to enable concealment of objects from identification by thermal imaging night vision systems, including deception of heat seeking missiles. The system also permits the creation of false heat signatures and false battle situation awareness.

The basic approach is that thermal imaging cameras reveal images, and heat-seeking missiles lock onto the target, based on the temperature contrast between the areas which they view and the background area of the relevant objects. By placing a screen, the temperature of which is equal to that of the background, between the camera or missile sensor and the object, the thermal image recorded by the camera will fail to capture the image of the object itself, regardless of the actual temperature of the object, or the missile sensor will not find the target or will lock on an object which is hotter than the protected object, or the lock will be lost.

The invention proposes the use of a screen, made of thermoelectric modules disposed between the target object and an IR detector. According to one embodiment, the screen is coupled to the target object. The thermoelectric modules are controlled by a microprocessor, or by an analog chip. The temperature of the screen is controlled with the use of sensors which continuously measure the background temperature (usually at the opposite side of the object from the viewer) and vary the level of power, based on the Peltier effect, in order to keep the surface temperature of the screen substantially equal to that of the background, even if the background is higher or lower than the ambient temperature. Thus, the present invention will confuse ATR systems and gunners using thermal vision systems.

Under such circumstances, the object will become invisible to a thermal imaging camera, or a heat seeking missile. In fact, if the object is "invisible" to IR sensors, an operator will not be able to see it or to aim at it.

In one embodiment, the screen comprises a large number of individual thermoelectric cells, each of which is controllable on an individual basis. As a result, by purposefully varying the temperature of each cell, the object may appear in a different configuration, effectively giving the thermal camera or ATR system a false heat signature. For example, this could allow the image of a tank to appear like a car, or a large rocket to appear like to a small hand weapon or a big truck carrying weapons or supplies to appear as a small car.

For example, a gun tube is visible when recently fired, as the gun tube is heated up. An adaptive thermoelectric system placed on the gun tube will create an "invisible" gun tube—unseen by IR detectors, and no data will be available that the gun has even been fired.

Similarly, the transport system becomes warmer and more visible during movement. Again, the system is adaptive and cools the screen according to the actual background temperature, so the object that is heating up remains concealed.

There is also provided a method for providing protection against thermal vision detection, the method including coupling a screen formed of at least one thermoelectric module to a target object, coupling a controller to the thermoelectric module for controlling the thermoelectric module, measuring ambient temperature and object temperature and providing an indication thereof to the controller, and varying the level of power provided to the thermoelectric module, in accordance with the indication, so as to create a selected temperature in at least part of the screen.

Preferably, this method may be used to create a fake heat signature for an object, or to change battle situation awareness.

According to an alternative embodiment of the invention, the method and the screen can be used to affect the radar signature and/or create a false radar image.

BRIEF DESCRIPTION OF THE DRAWINGS

The present invention will be further understood and appreciated from the following detailed description taken in conjunction with the drawings in which:

FIGS. 8a and 8b are schematic illustrations of the illusion of an object advancing and an object retreating, respectively;

FIG. 8c is a schematic illustration of a plate according to the system of the present invention arranged for creating an illusion according to FIG. 8a or 8b;

FIG. 8d is a schematic illustration of an illusion created by the plate of FIG. 8c;

FIGS. 10a and 10b illustrate schematically different controlled dispositions of the plates according to FIGS. 9a, 9b and 9c;

FIG. 11a illustrates a portion of background against which an object protected by the system of the invention may stand;

FIG. 11b illustrates a protective plate simulating the portion of background of FIG. 11;

DETAILED DESCRIPTION OF THE INVENTION

The present invention relates to a thermal vision countermeasure system to enable concealment of objects from identification by thermal imaging night vision systems and/or for deception of heat seeking missiles. The invention relates to the use of heat radiation to create equilibrium with the background radiation—hotter or cooler—by using controlled thermoelectric (Peltier effect) modules. The system also permits changing the heat signature by generating a fake thermal signature for all or part of the object, so as to mislead a viewer, so the target cannot be identified or classified, and to create false battle situation awareness. Activating the system according to the present invention will substantially reduce detection and view, in one case, or cause a mistake of target classification, in another case, depending on whether the user of the system selects a stealth or deception mode.

Figure 1:
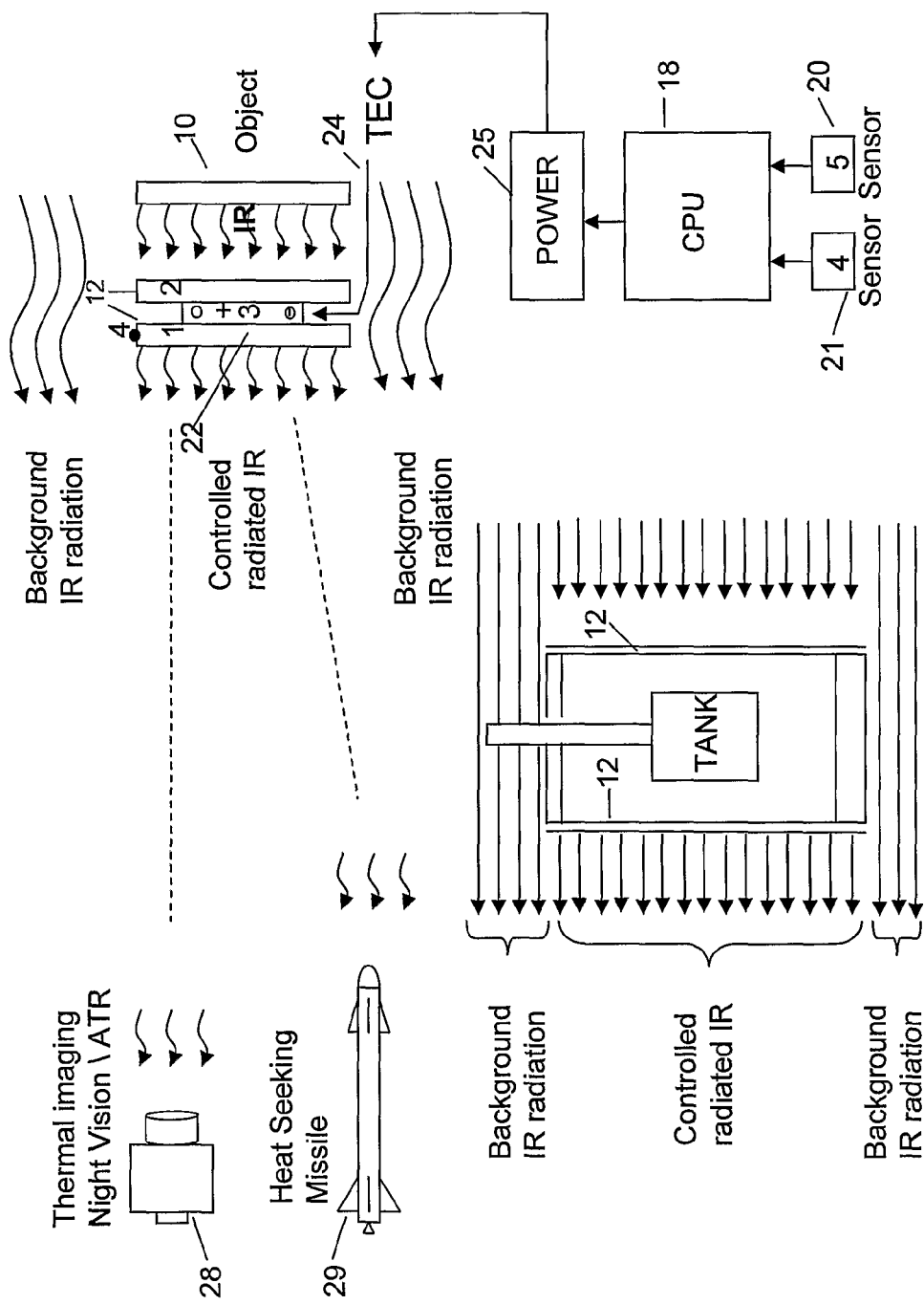
FIG. 1a and FIG. 1b are schematic illustrations showing a basic principle of operation of one embodiment of the present invention.

FIG. 1a and FIG. 1b are schematic illustrations showing the basic principle of operation of one embodiment of the present invention. One part of the system, shown in FIG. 1a, is a thermoelectric screen or covering preferably coupled close to the surface or surfaces of an object 10, such as a tank (or other military vehicle, including marine, airborne and other vehicles), preferably in the form of a series of plates 12 (produced from aluminum or other suitable material). For vehicles or other moving objects, it is desirable to couple the screen to the object. For stationary objects, the screen can be mounted adjacent and/or above the object at a distance, as long it remains between the object and an anticipated Infra Red (IR) or other thermal sensor.

The other part, shown in FIG. 1b, is the control unit 18 and sensors 20, 21 located near the protected object 10. Sensor 20 serves to sense the temperature of the screen 12 and sensor 21 senses the ambient or background temperature.

The intention is to control the surface temperature of the plates 12 in such a way that a heat signature is generated, substantially equal to the ambient or background heat signature, resulting in the object being either invisible to a thermal imaging camera 28 or heat seeking missile 29, or appearing in a way designed to mislead the viewer of a thermal imaging camera or ATR (automatic target recognition) system.

The approach is based on use of a TEC module 22 utilizing the known Peltier Effect, which occurs when a current is passed through two dissimilar metals or semiconductor (n-type and p-type) that are connected to each other at two junctions (Peltier junctions) (not shown). The current through wires 24 drives a transfer of heat from one junction to the other, i.e., one junction cools off while the other heats up. Reversing the polarity causes the heat to flow in the other direction. TEC module 22 may be controlled by a microprocessor or analog chip.

When a current is made to flow through the circuit, as from a power source 25, heat is evolved at one junction and absorbed at the second junction. Peltier coefficients represent how much heat current is carried per unit charge current through a given material. Since charge current must be continuous across a junction, the associated heat flow will develop. This causes a non-zero divergence at the junction and so heat must accumulate or deplete there, depending on the direction of the current. When each junction is coupled to an aluminum plate, the coupled plate heats up or cools down, according to the current flow direction and level. A plurality of individual pairs of junctions can be connected in series or parallel to enhance the effect, and are called herein TEC modules 22.

A consequence of this effect is that the direction of heat transfer is controlled by the polarity of the current; reversing the polarity will change the direction of transfer and thus the sign of the heat absorbed/evolved. A Peltier cooler/heater or thermoelectric heat pump is a solid-state active heat pump which transfers heat from one side of the device to the other. Peltier coolers are also called thermoelectric coolers (TEC).

Figure 2:
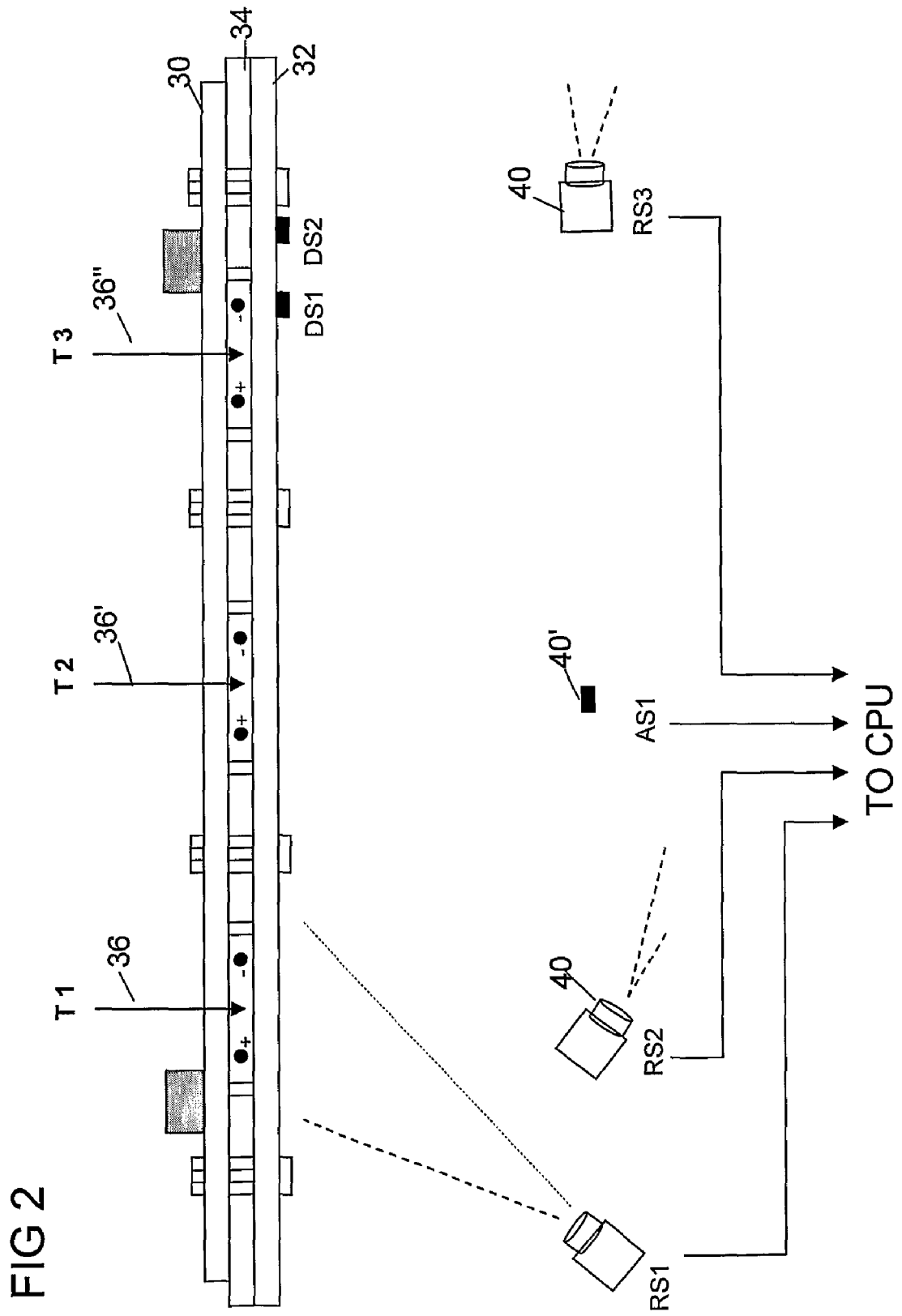
FIG. 2 is a detail illustration of a portion of the system of one embodiment of the invention.
Figure 3:
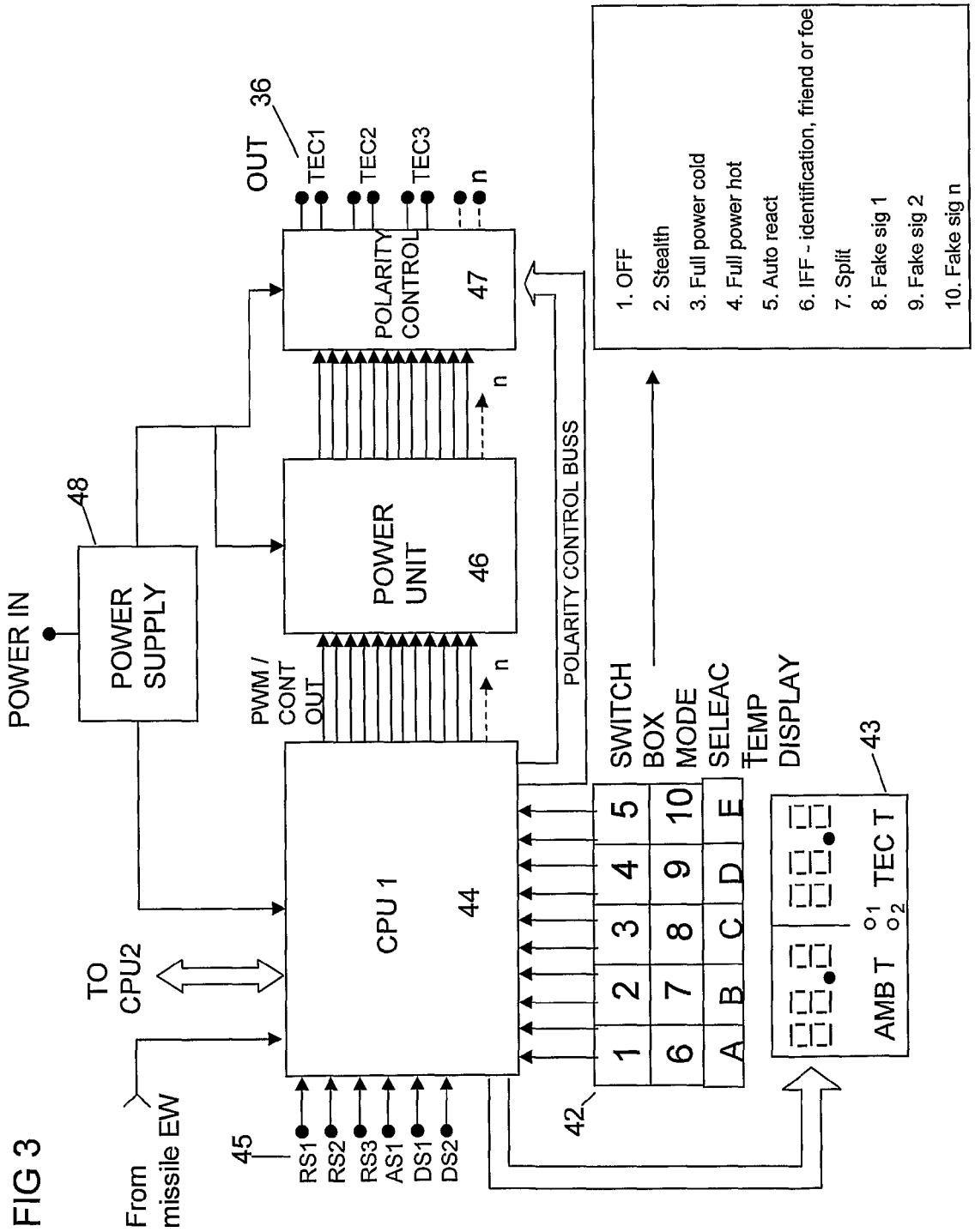
FIG. 3 is a schematic illustration showing the main control of the basic system and its functions, according to one embodiment of the invention.

As shown in FIG. 2 and FIG. 3, the system of the invention includes the following components:

a) Thermoelectric modules 36, 36', 36".

b) Aluminum or copper plates 30, 32 thermally attached to the TEC modules 36, 36', 36" and acting as heat sinks for the TEC modules (one thermally coupled to the hot side and one to the cold side), with a thermal insulation foam 34 strongly sandwiched between the two heat sinks.

c) A series of sensors designed to gauge and report the ambient temperature 40', the surface temperature of one side of the plates RS1, DS1, DS2, and the background or ambient temperature at remote locations 40.

d) A control switch 42—operated by the commander of the tank or other object, giving the ability to activate or deactivate the system, or to vary its capabilities.

e) A microprocessor 44—accepts information from the sensors 45 (in FIG. 3), calculates the electrical power input required to achieve equilibrium between the surface temperature of the plates and the background temperature, and instructs a power unit 46 and polarity control unit 47 accordingly, to send power to TEC modules 36 to adjust their temperature to a selected temperature, preferably by pulse width modulation (known as PWM). A temperature display 43 may be provided to display ambient and TEC temperatures.

f) A power unit 46—connected to a power source 48 (commonly a generator or battery, such as the battery of an object vehicle, or mains electricity for a building).

g) Software—a management system to collect data and run the microprocessor, including algorithms to vary the power output in real time, e.g., measuring a continuous series of pulses.

The illustrated embodiment shows thermoelectric modules T1,T2,T3 36 placed between two aluminum plates and pressed by screws. When power is applied to the TEC modules, one side, and thus one plate, becomes hot and the other cold, and vice versa, if the polarity of the power is reversed.

The positioning of the plates will determine the angles from which the object will be screened. The use of plates in layers and different places enables the object to be covered completely, thereby concealing the object from detection when viewed from any point, including by satellite, unmanned vehicle, airplanes or other.

Positioning of the plates on the object will be such that they can be removed, when desired. For example, they will be unnecessary in daylight and need only be attached to the object depending on the specific operations being undertaken by the object at the relevant times—such as when the element of surprise is important to approach the enemy, when deception is required, for example, to show small ground forces (i.e., small vehicles) while, in reality, the force is tanks, or bigger rockets than appears from the controlled thermal signature, and other applications according to combat needs.

The plates can be modular, or of pre-selected sizes and/or custom made for specific weapon\tank\truck\marine\airborne system, etc.

Figure 4:
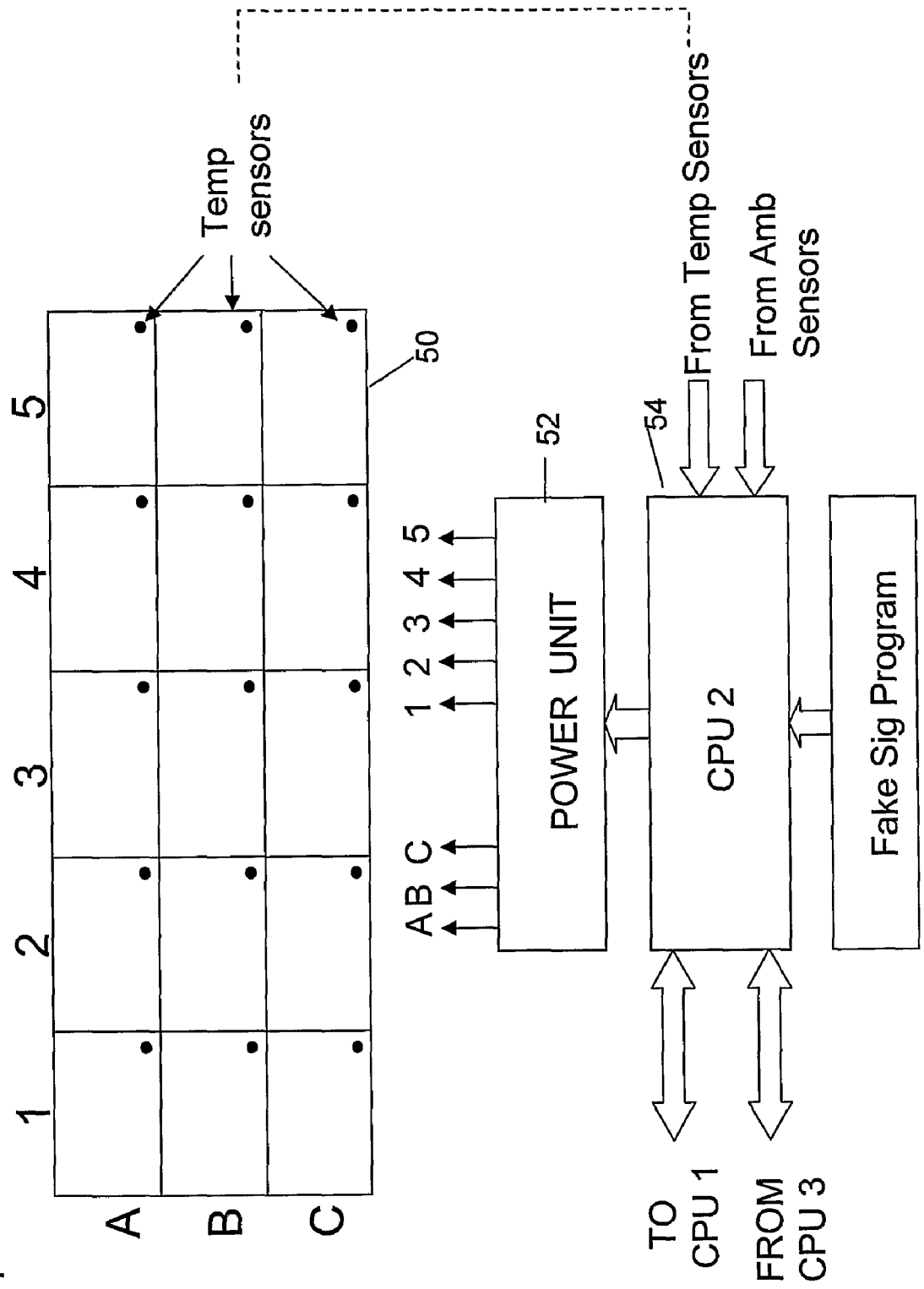
FIG. 4 is a schematic illustration showing a matrix of TEC cells for use in simulating false heat signatures.

Referring now to FIG. 4, there is shown a system according to an alternative embodiment of the invention. By dividing the aluminum plates into a series of individual cells 50, each connected directly to a controlled power unit 52, but with the ability for the power to each one to be varied independently, the system will have Pattern Switching capabilities. In effect, this enables the operator to manipulate the image seen by a thermal camera, by actively varying the emitted temperatures so as to create a preset heat signature. Thus, the actual heat signature can merely be modified, or it can be replaced by the heat signature of an entirely different object. The power unit is coupled to a matrix control CPU 54 which is, in turn, coupled to the microprocessor 44 of the control unit shown in FIG. 3.

Figure 5:
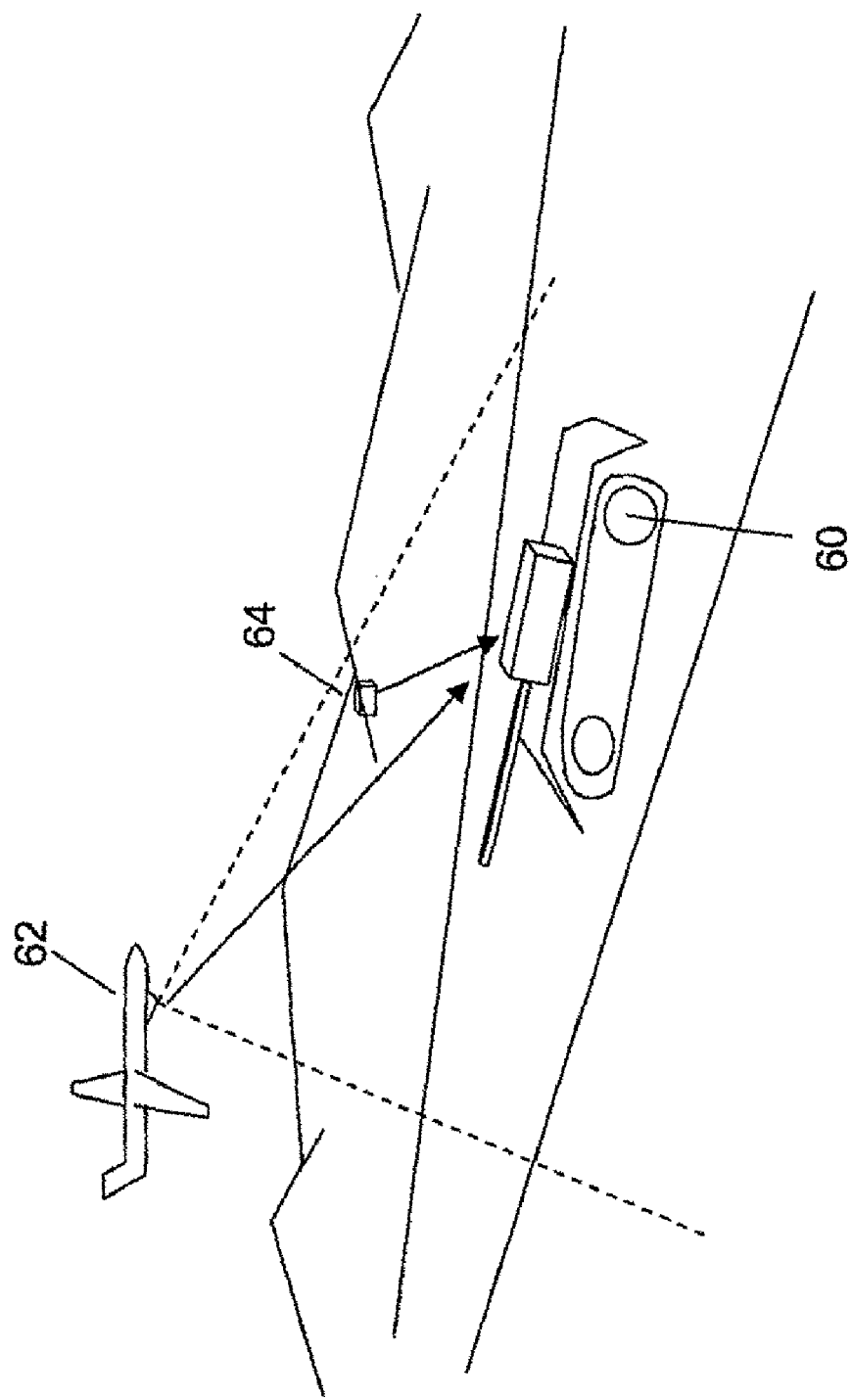
FIG. 5 illustrates a combat situation of an UAV (Unmanned Aerial Vehicle) seeking from top while an observer from the side also seeks the target.
Figure 7:
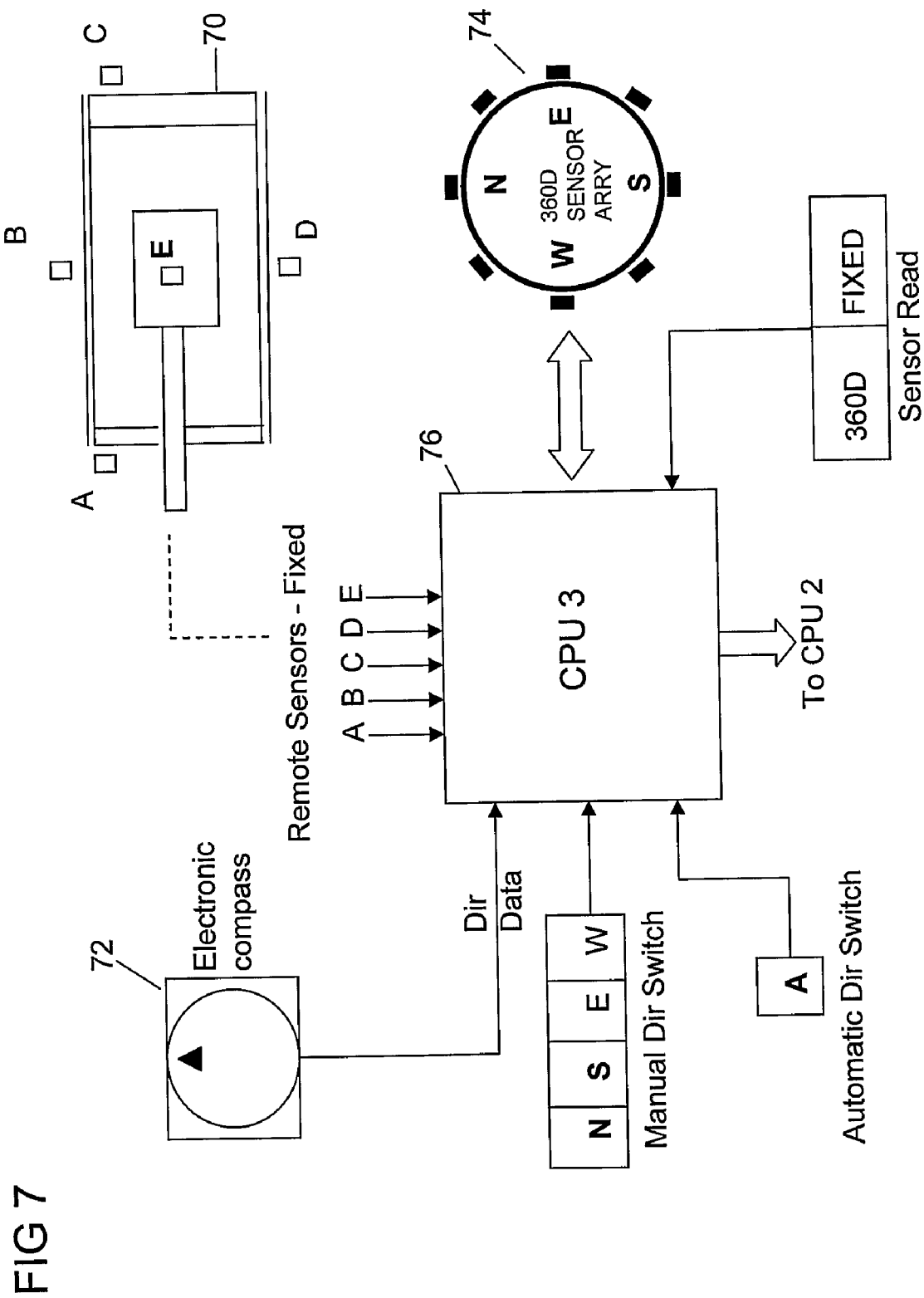
FIG. 7 is a schematic illustration of a system according to another embodiment of the invention for providing automatic directional heat signature or stealth.

System features may include any or all of the following elements:

1. system off;
2. stealth: the object temperature is substantially equal to background and therefore the object is not seen by thermal imaging cameras or heat seeking missiles.
3. full power cold: for testing and for maximum cooling, so a heat seeking missile will prefer any other heat source, or for use in very cold ambient temperatures (snow, cold winter area);
4. full power hot: for testing and for maximum heating in a hot environment (desert, near fire, etc)
5. auto react: connected to radar or other EW (early warning) system so, when a threat of heat seeking missiles is detected, the system reacts automatically by applying maximum cooling to escape detection by the seekers of the missiles;
6. IFF—Identification of friend or foe—generate a pre-set unique thermal signature to be identified by friendly forces, UAV, airplane, ship, or to send distress SOS signal (hurt, out of fuel, communication system damage, etc.). This signal can be in any agreed form, including numbers, letters and other signs.
7. split: a feature that provides the ability to generate different thermal signatures for different regions on the object, for example, for plates on an object 60 facing different directions, as shown in FIG. 5. For example: A screen pointing toward the sky can be heated to 25 deg C. and a screen pointing to the right side can be heated to 17 deg C., so if the road temp (asphalt) is 25 deg C. and the side mountains\trees are only 17 deg., the result is that the object 60 will be hidden from a flying sensor 62, such as UAV, airplanes, satellites from above and, at the same time, from ground observation by an observe[r] 64;
8. One or more fake heat signatures—a pre-programmed bank of fake signatures can be provided. When this feature is selected, a sub system (shown in FIG. 7) automatically monitors the direction of the tank 70 or object by means of an electronic compass or GPS 72 and accordingly selects the appropriate sensor from a 360 deg sensor array 74 that monitors the opposite side remote background temperature of object 70 and reports it to a third CPU 76. Then, when turning, the object appears to emit the same background temperature as in the new direction and becomes invisible to a thermal viewer or heat seeking missile that may be expected from that direction. CPU 76 controls all the features of the automatic directional fake heat signature and reports to main CPU 33 (seen in FIG. 3) that generates the thermal signature.

CPU 54 (shown in FIG. 4) is responsible for the creation of false heat signatures by activating matrix 50 of thermoelectric units (TEC) to create false patterns of heat signatures controlled by CPU 54. Each TEC cell may be constructed as described above with reference to FIG. 2, and can include a single TEC module or several TEC modules. In this way, for example—if TECs number A1,B2,C3,B4,A5 in FIG. 4 are hotter than the ambient, while all others are at ambient temperature, the shape of the letter V will be detected. It will be appreciated that the greater the number of TEC modules, the finer the resolution and the more complex the heat signature that can be simulated.

The pre set program is entered into CPU 54 by means of software in the microprocessor, and the selection of the image (fake signature) can be made manually by using the main switch box (FIG. 3). The various signature programs are stored in the memory of CPU 54.

Figure 6:
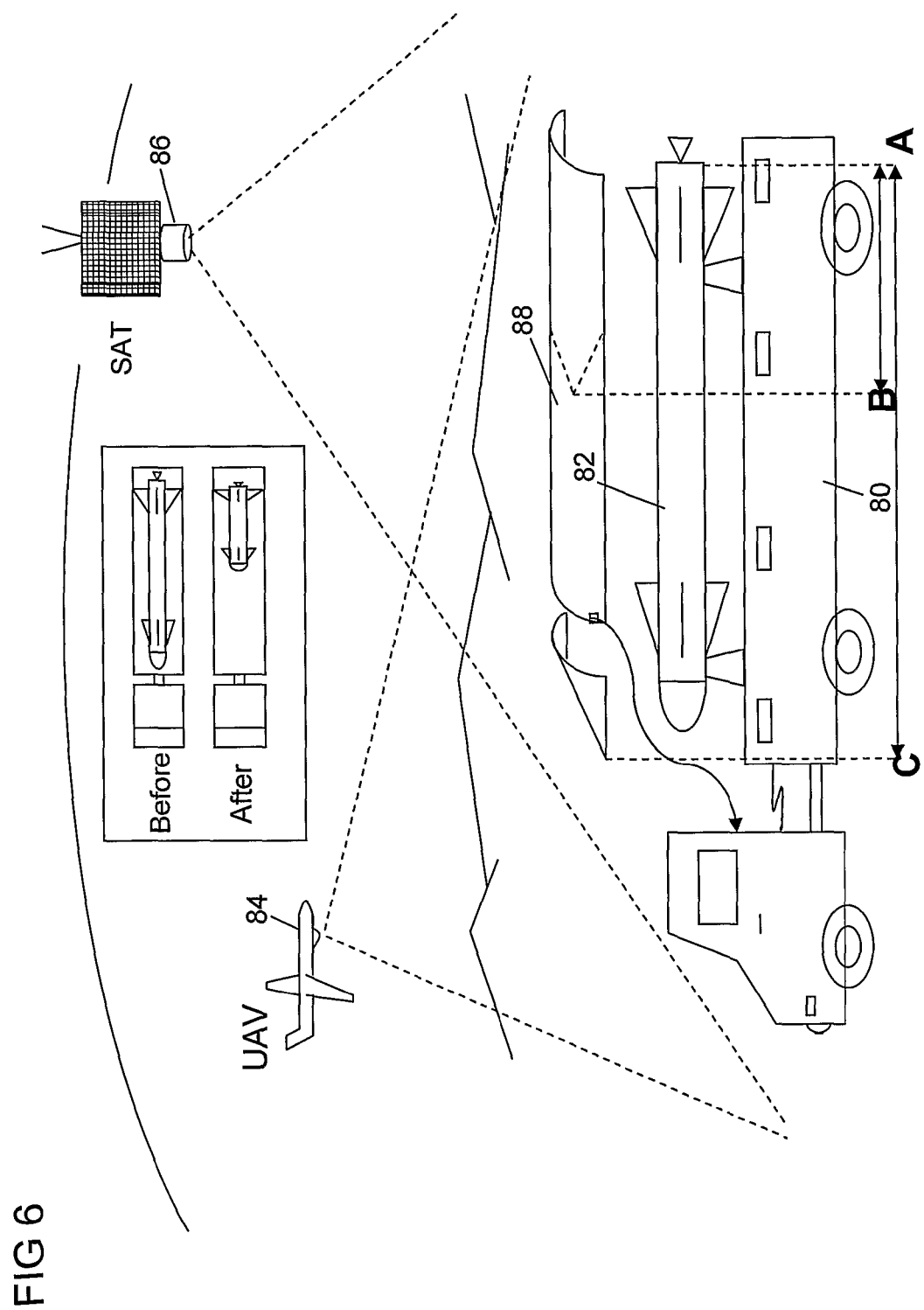
FIG. 6 illustrates a truck utilizing the system of one embodiment of this invention.

FIG. 6 illustrates a truck 80 carrying a missile 82, or any other weapon, protected by the system in this invention. A plurality of plates 88 are installed on the missile 82 or on the truck 80 to create a false heat signature, so that it appears that the truck is carrying a smaller missile than it really is, or is camouflaged so that it cannot be seen at all, when it is observed by a UAV 84 and/or satellite 86 and or other observer. For example, the part indicated AB may be hotter than ambient temperature, while the portion labeled BC is at equilibrium with the ambient.

It will be appreciated that the three microprocessors 44, 52, 76 can be embodied in a single CPU, if desired, for example, when utilized to protect ground structures, such as military facilities, nuclear plants, command centers, etc.)

According to several embodiments of the invention, an array of TEC modules, mounted on an object to be camouflaged, may be used to create a false thermal signature for the camouflaged object. This can be accomplished, among other ways, by selecting a desired thermal image to be projected, by copying a portion of background, e.g., using a DSP chip to capture the image and radiometric data of the scene, or by copying any other object having the desired thermal signature.

Referring to FIGS. 8a and 8b, there are shown schematic illustrations of false images generated on an array of TEC modules. In this case, an object 90 can be shown to be approaching a viewer 92 (FIG. 8a) or moving away from the viewer 92 (FIG. 8b). This can be accomplished, as shown in FIGS. 8c and 8d, by heating up or cooling down edge pixels 96 in plates 94 (or edge plates in a TEC plate array) mounted on the object. Thus, in FIG. 8b, viewer 92 can be tricked into seeing an advancing vehicle (tank, APC etc.) as if it is actually retreating, because the number of pixels "representing" the desired image is reduced. This deception is particularly effective at night, when the depth perception of a viewer using a thermal imaging camera, or using sight alone, is problematic, by nature, since the 2-dimensional image of the thermal signature does not have depth cues. For example, the edge TEC units, e.g., A1, A2, A3, A4, B1, C1, D1, D1, E1, F1, G1, A4, B4, C4, D4, E4, F4, G4, G2 and G3, are given a lower temperature (the same as the background) than the central TEC units, which are activated with the positive signature (hotter than the background) producing a smaller thermal image 98 as the vehicle advances. In this way, the invention utilizes the dragonfly effect, whereby the portions of the plate having the same temperature as the background cannot be distinguished from the background.

It will be appreciated by those skilled in the art that there is little uniformity of temperature in nature. Rather, there is "texture" to the thermal image resulting from slight differences in temperatures in adjacent objects. This texture can be imitated by providing slightly different temperatures to various TEC units in the protective plate.

Figure 9A:
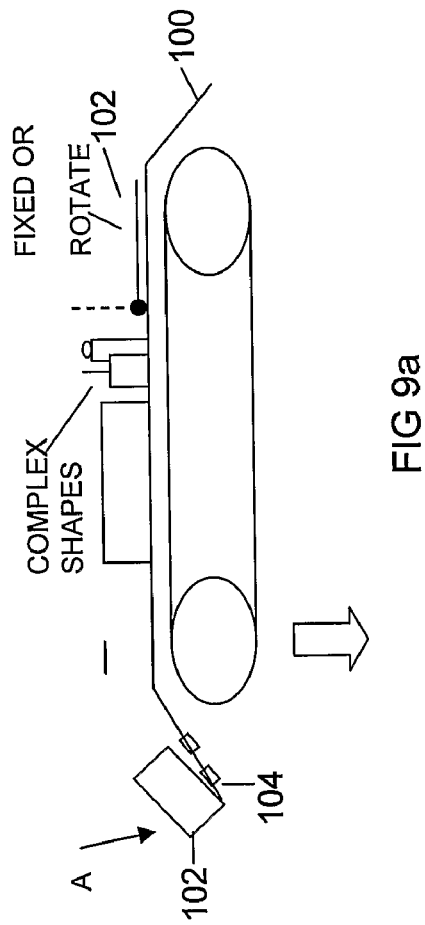
FIGS. 9a and 9b are schematic illustrations of a tank having one or more plates according to the system of the invention.
Figure 9B:
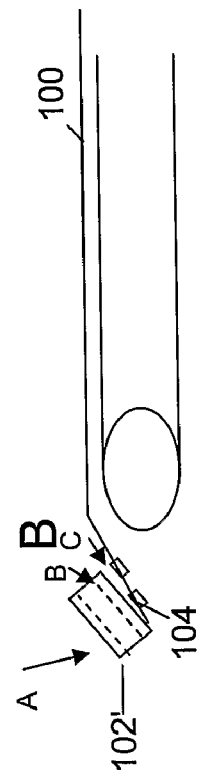
Figure 9C:
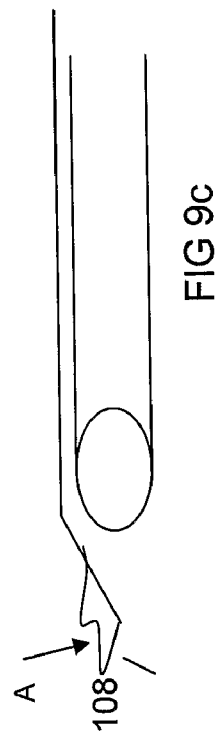
FIG. 9c illustrates a tank having a plate arranged according to another embodiment of the invention.

Another method of creating a false or misleading signature is illustrated schematically in FIGS. 9a and 9b. FIGS. 9a and 9b are schematic illustrations of a tank 100 on which are mounted one or more plates 102 according to the system of the invention. Plates 102 may be mounted on electrical, pneumatic, hydraulic or mechanical lifting means 104 for moving them onto and off of the object to be protected (here tank 100). In this way, automatic target recognition (ATR) devices, which identify the silhouettes of various objects, will be unable to identify the object. FIG. 9b illustrates a plate 102' mounted according to one embodiment of the invention. As can be seen in FIG. 10a, plate 102' can be tilted to several different angles. At each degree of tilt, a different size plate (A, B, C) will be viewed by a viewer 104, thereby increasing the number of different silhouettes that can be generated by a single plate. Alternatively, the plate can be rotated, as illustrated in FIG. 10b, thereby also providing silhouettes of a variety of sizes and shapes and hiding elements on tank 100 having various complex shapes. According to yet another embodiment of the invention, shown in FIG. 9c, the plate, itself, can have a rounded shape, or an unusual profile, to provide an even more confusing and/or blending contour to the protected object.

It will be appreciated that the unit of FIG. 10b can be attached to a glass window or windshield, so as to provide selective thermal screening. Thus, by rotating the plate, as by means of a motor, the window can be opened or closed. In this way, during the day, when a clear view of the surroundings is required, the window can be opened, while at night, when thermal detection is to be avoided, the window can be closed and the plate become active. When the windshield is closed, the driver can look forward, for example, by using a forward facing thermal imaging camera coupled to an LCD or other display unit inside the vehicle. It will be appreciated that it is important to cover the window, as it may reflect the sky or other objects.

Another use of this embodiment of the invention is to create a false SAR radar signature. Rotating plates can be placed on top and/or on the edges of the object to be protected, which will change the image viewed with SAR radar, and will confuse an ATR system, thereby creating a false identification and false situation awareness. Providing coordination and precise control to several plates disposed in pre-selected locations on the object can create the desired fake SAR radar signature.

Referring now to FIGS. 11a and 11b, there is illustrated a method for generating a false signature according to a selected background image. FIG. 11a illustrates a selected image 110 taken from the background 112 against which an object protected by the system of the invention may stand. As can be seen, the actual background object has thermal signature which includes areas of differing temperatures, i.e., an image with texture. In order to create the illusion of image 110, the various TEC units 114 in the protective plate 116 are heated to the same temperatures as the selected image 110.

Figure 13:
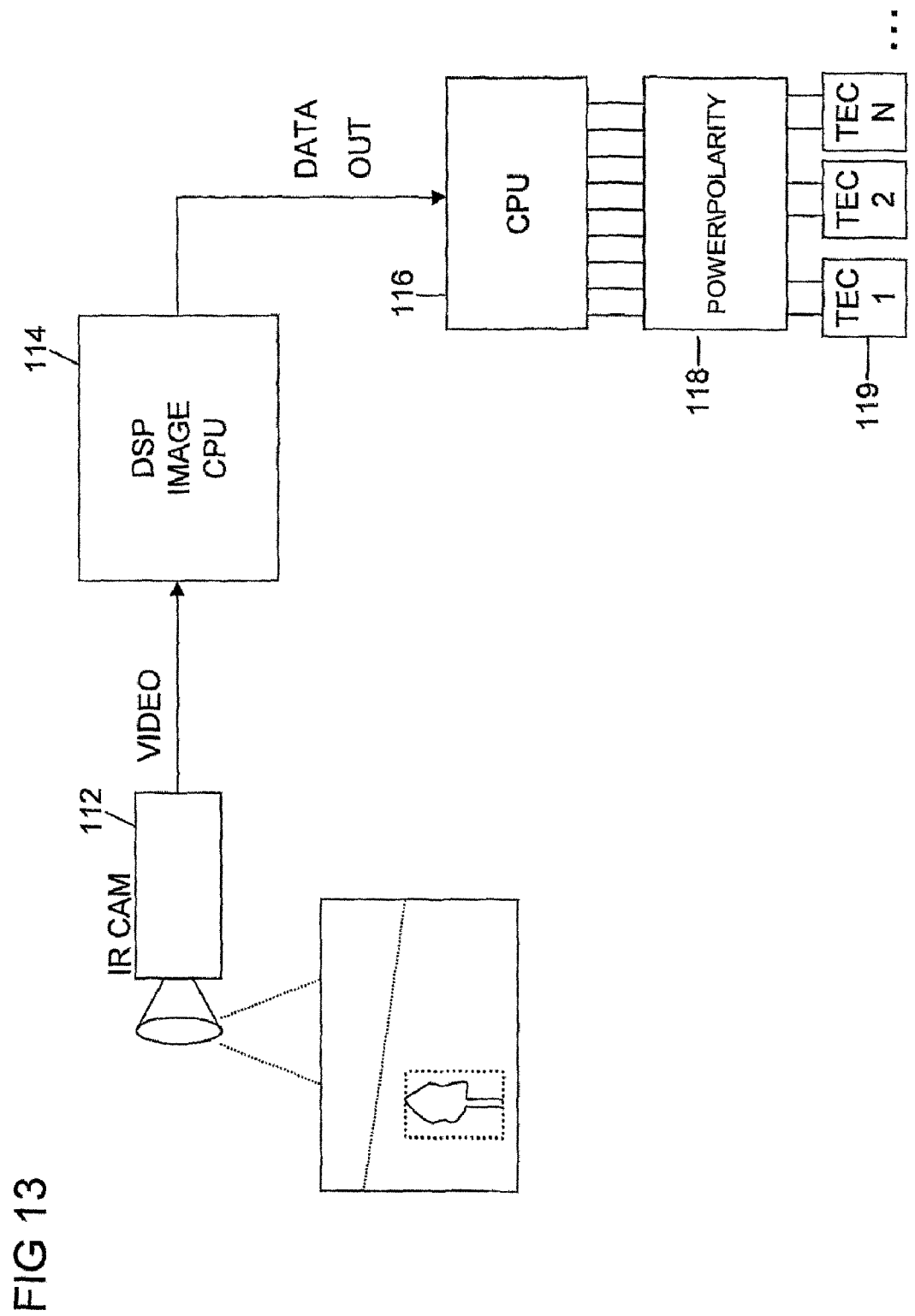
FIG. 13 is a schematic illustration of an image processing protective system according to different embodiments of the invention.

One apparatus for providing the image of FIG. 11b is shown schematically in FIG. 13. An IR or other thermal imaging camera 112 is aimed at the desired location on the horizon or at any other selected area. Video images from camera 112 are captured to a digital signal processor (DSP) 114 or imaging CPU, which analyzes the gray levels of the IR image. The gray levels of the IR image correspond to radiometric data about the selected location. Alternatively, other image data corresponding to the radiometric data can be utilized. The output data, which can be essentially a projected thermal image, is transmitted to the CPU 116 controlling the power and polarity generators 118 which, in turn, are coupled to the various TEC units 119. In this way, CPU 116 instructs the various TEC units to heat or cool so as to produce the image provided by DSP 114. In this way, the generated thermal signature can be made to fit better into the local terrain, whether stones, bushes, etc., and looks more natural.

According to one embodiment of the invention, the CPU 116 can compare the temperature using a closed loop or feedback loop. This embodiment works according to the Proportional, Integral and Derivative (PID) equation, so is able to achieve fast response times when changing or updating the displayed thermal image.

It will be appreciated that DSP 114 can distinguish sky from land to find the horizon line, and concentrate on the terrain. Thus, in addition to changing the contour of an object, it is possible to change its appearance when viewed by a remote viewer. The raw data of the gray levels of the image are sent from the DSP to the CPU, and a particular field of view can be selected manually or automatically for use.

According to another embodiment of the invention, the DSP can also analyze the horizon line and the temperature above the horizon, and determine the maximum angle of elevation at which a projected thermal image is believable against the skyline. This embodiment is particularly useful for providing protection for rotorcraft, such as helicopters. In this case, the sensor camera is preferably stabilized by a gyroscopic system. Such a DSP analysis is required because the sky temperature can be very low, even below 0 at 90° elevation, while, in many cases, the sky temperature just above the horizon is almost the same as the ground temperature. Thus, the thermal signature of the background can be applied above the horizon until the elevation at which the temperature of the background (i.e., the sky) drops to a point that is beyond the system performance. It should also be noted that, in some weather conditions on a clear day, the permitted angle of elevation will be smaller, as the background will be colder, which limits the system performance. In other cases, when the rotorcraft is at low altitude and near hills or mountains, the background may be below the horizon. It is a particular feature of the invention that covering a helicopter with the plates of the invention will create a stealth helicopter which is virtually invisible to thermal heat seeking missiles, thereby avoiding detection and hitting.

Figure 12:
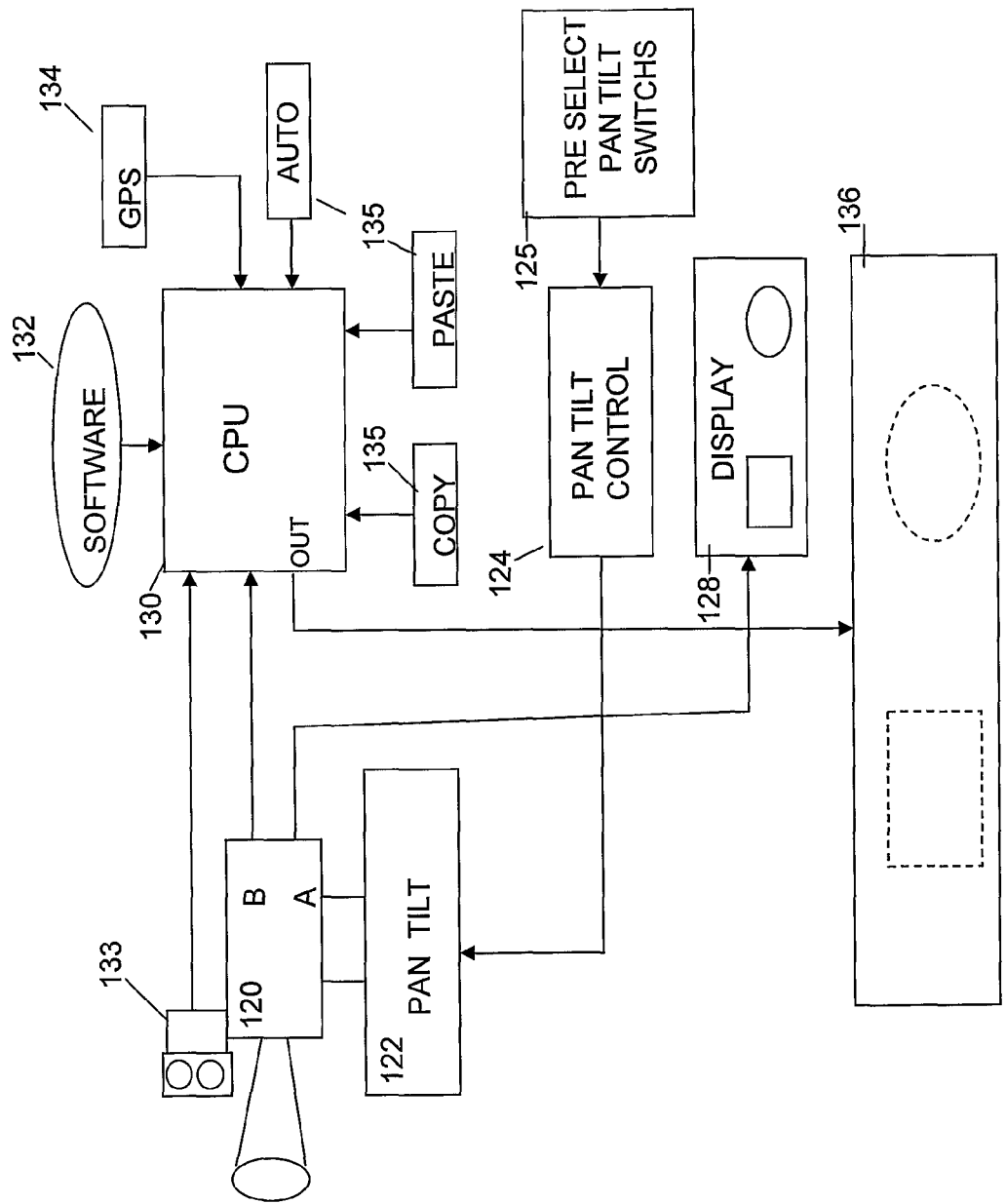
FIG. 12 is a block diagram illustration of a device for providing the simulation of FIG. 11b.

A block diagram of one apparatus for carrying out this process is shown in FIG. 12. A thermal imaging or radiometric camera 120 is provided for viewing the background. Preferably, a device 122 for providing pan and/or tilt of camera 120 is coupled to camera 120. A pan/tilt controller 124, which may be controlled by pre-selected pan/tilt switches 126, or automatically directly by the CPU, is drivingly coupled to device 122. Camera 120 provides two outputs—one to a display 128, for example, to permit viewing by a remote controller, and a second to a CPU 130 In this way, it is possible to "copy and paste" a portion of the background terrain to the TEC modules to reproduce the thermal signature of the terrain. A laser range finder 133 may be provided, coupled to camera 120, for providing range data and, therefore, of the advance of various assets (i.e., tanks, APC, etc.) One or more switches 135 may be provided, as desired. Software 132 can be stored in or coupled to CPU 130, as required. If desired, a GPS unit 134 can be coupled to CPU 130 to provide information as to absolute location, direction and speed of the object. The output of CPU 130 is signals driving the various TEC units in protecting plate 136 to simulate the captured image.

Figure 14B:
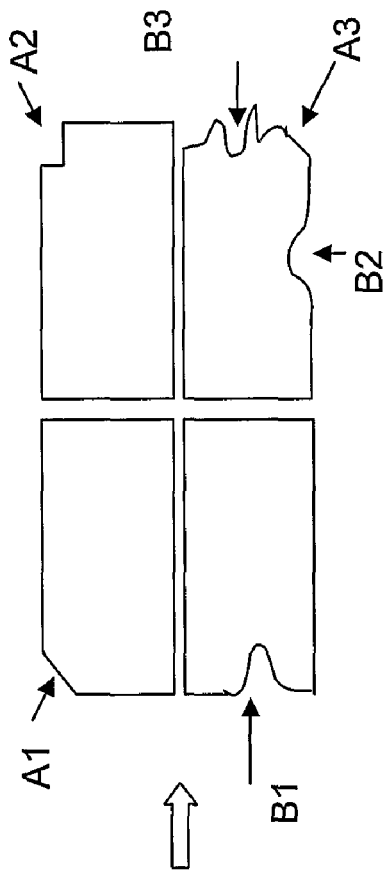
FIG. 14b is a schematic illustration of protective plates according to a further embodiment of the invention.
Figure 14A:
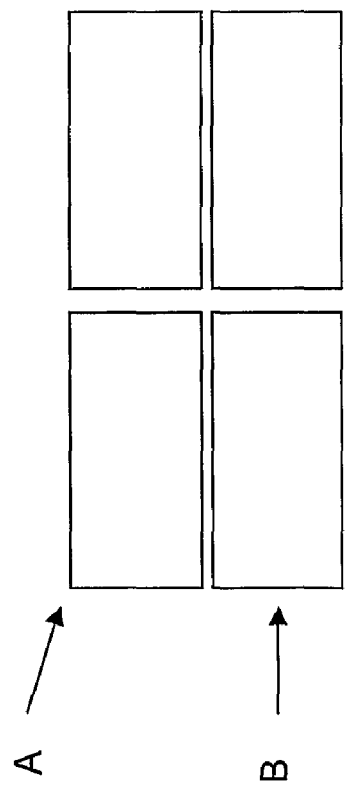
FIG. 14a is a schematic illustration of protective plates according to one embodiment of the invention.

It will be appreciated that the edges of the plates can be of different shapes or can have different types of cutouts, so as to blend better with the background. Thus, while standard plates can be substantially rectangular, as illustrated in FIG. 14a, the plates can, alternatively, have various cutouts along the edges as shown in FIG. 14b.

According to one embodiment of the invention, when the protective element is formed of a large group of TEC units, small groups of TEC units can be powered up, one at a time. Thus, a first group of TEC units, for example, 1 square meter, can be powered up until it reaches the background temperature, consuming high power during the process but only for relatively few TEC units, at which time the power to maintain those units drops to a low level. Now, a second group of TEC units can be powered up, and so forth, until the entire surface is active. In this way, the power peak during the initial power up of a large group of TEC units can be avoided.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. An infrared detection countermeasure system comprising:
   a screen, formed of at least one thermoelectric module, couplable to a target object, and a pair of aluminum or copper plates coupled to said thermoelectric module and acting as heat sinks for said thermoelectric module;
   a controller for controlling said thermoelectric module;
   at least two temperature sensors for measuring ambient temperature and temperature of one side of said thermoelectric module and providing an indication thereof to said controller; and
   a power source coupled to said thermoelectric module;
   wherein said controller is coupled to said power source for causing said power source to provide a level of power, selected in accordance with said temperature indications, to said thermoelectric module so as to generate a selected temperature in at least part of said screen;
   wherein said controller is operative to generate a selected temperature in at least part of said screen to provide a false thermal signature;
   further comprising:
   a thermal imaging camera for providing an image of background to be imitated;
   a digital signal processor (DSP) coupled to said camera, for analyzing radiometric data of said image;
   a CPU coupled to said DSP for receiving said analyzed gray levels and providing an output for controlling power; and
   polarity generators which, in turn, are coupled to the various TEC units.

2. The system according to claim 1, wherein said at least one thermoelectric module includes a plurality of thermo electric modules.

3. The system according to claim 1, wherein said controller is operative to generate a temperature in at least part of said screen which is substantially equal to background temperature.

4. The system according to claim 1, wherein said controller is operative to generate a selected temperature in at least part of said screen to provide a false thermal signature.

5. The system according to claim 1, wherein said controller is operative to generate a temperature in at least part of said screen to simulate a thermal signature of a different object.

6. The system according to claim 1, wherein said controller is a microprocessor.

7. The system according to claim 1, wherein said controller is an analog chip.

8. The system according to claim 1, further comprising:
   a pan/tilt mechanism coupled to said camera; and
   a GPS unit and a laser range finder coupled to said CPU.

9. The system according to claim 1, wherein said screen comprises a plurality of individual thermoelectric cells, each of which is controllable individually by said controller.

10. A method for providing protection against thermal vision detection, the method comprising:
    coupling a screen formed of at least one thermoelectric module to a target object;
    coupling a pair of aluminum or copper plates to said thermoelectric module acting as heat sinks for said thermoelectric module;
    coupling a controller to said thermoelectric module for controlling said thermoelectric module;
    measuring ambient temperature and object temperature and providing an indication thereof to said controller; and
    varying a level of power provided to said thermoelectric module, in accordance with said indication, so as to generate a selected temperature in at least part of said screen;
    further comprising:
    varying a level of power provided to said thermoelectric module so as to create texture, by providing slight differences in temperature in adjacent portions of said thermoelectric module adjacent a viewed object.

11. The method according to claim 10, further comprising:
    providing a database of thermal signatures; and varying a level of power provided to said thermoelectric module so as to generate a selected temperature on said screen in accordance with a thermal signature selected from said database.

12. The method according to claim 10, further comprising coupling at least one said screen to an object to change a silhouette of the object.

13. The method according to claim 10, wherein said step of varying includes varying a level of power provided to a plurality of thermoelectric modules so as to generate a selected temperature on said screen in accordance with a pre-selected thermal signature.

14. A method for providing protection against thermal vision detection, the method comprising:
  coupling a screen formed of at least one thermoelectric module to a target object;
  coupling a pair of aluminum or copper plates to said thermoelectric module acting as heat sinks for said thermoelectric module;
  coupling a controller to said thermoelectric module for controlling said thermoelectric module;
  measuring ambient temperature and object temperature and providing an indication thereof to said controller; and
  varying a level of power provided to said thermoelectric module, in accordance with said indication, so as to generate a selected temperature in at least part of said screen;
  wherein said step of varying includes varying a level of power provided to a plurality of thermoelectric modules so as to generate a selected temperature on said screen in accordance with a pre-selected thermal signature;
  wherein said pre-selected thermal signature is acquired by:
  capturing selected images from a thermal camera in a digital signal processor or imaging CPU,
  analyzing said images to determine radiometric data thereof; and
  providing output signals corresponding to said radiometric data to vary said level of power so as to generate, on said screen, a thermal image having said determined radiometric data.

* * * * *

UNITED STATES PATENT AND TRADEMARK OFFICE
CERTIFICATE OF CORRECTION

| | | |
|---|---|---|
| PATENT NO. | : 8,013,302 B2 | Page 1 of 1 |
| APPLICATION NO. | : 12/376436 | |
| DATED | : September 6, 2011 | |
| INVENTOR(S) | : Ronen Meir | |

It is certified that error appears in the above-identified patent and that said Letters Patent is hereby corrected as shown below:

On the Title page insert, item:

--(30)    Foreign Application Priority Data

Aug. 8, 2006    (IL) ................................177368--

Signed and Sealed this
Fifth Day of March, 2013

Teresa Stanek Rea
*Acting Director of the United States Patent and Trademark Office*